United States Patent [19]
von Bauer et al.

[11] Patent Number: 5,428,388
[45] Date of Patent: Jun. 27, 1995

[54] VIDEO DOORBELL SYSTEM

[75] Inventors: Richard P. von Bauer, Yorba Linda, Calif.; Douglas W. Eberlen, Pasadena, Calif.

[73] Assignee: Richard von Bauer, Anaheim Hills, Calif.

[21] Appl. No.: 898,713

[22] Filed: Jun. 15, 1992

[51] Int. Cl.⁶ ............................................. H04N 7/18
[52] U.S. Cl. ..................... 348/155; 348/156; 379/56; 379/58; 379/103; 379/176; 455/66
[58] Field of Search ..................... 358/108; 379/53, 56, 379/58, 103, 167, 176; 455/66; H04N 7/18; 348/156, 155

[56] References Cited

U.S. PATENT DOCUMENTS

| | | | |
|---|---|---|---|
| 4,370,675 | 1/1983 | Cohn | 358/108 |
| 4,631,365 | 12/1986 | Potter | 379/167 |
| 4,715,060 | 12/1987 | Lipscher | 379/70 |
| 4,731,821 | 3/1988 | Jackson | 379/103 |
| 4,764,953 | 8/1988 | Chern | 379/103 |
| 4,959,713 | 9/1990 | Morotomi | 358/108 |
| 5,079,634 | 1/1992 | Hosono | 358/108 |
| 5,280,266 | 1/1994 | Kao | 358/108 |

*Primary Examiner*—Howard W. Britton
*Attorney, Agent, or Firm*—William L. Chapin

[57] ABSTRACT

A communication apparatus for monitoring sounds and images at a remote location, such as the entranceway of a dwelling or other building includes a sensor station located at the entranceway, and a monitor station located within the building. A microphone and television camera in the sensor station modulate signals, preferably of radio frequency, emitted by a wireless transmitter in the sensor station. The monitor station includes a transmitter and demodulator for reproducing sounds and visual images received by the sensor station. Preferably, the monitor station contains a microphone and transmitter for transmitting voice signals from the monitor station to the sensor station, in which case, the sensor station contains a receiver and loudspeaker for reproducing the voice signals. The preferred embodiment of the sensor station includes an internal battery rechargeable by being connected across the terminals of an existing doorbell button, the charging current being limited to a value which insures that a doorbell connected to the button will not be activated unless the button is depressed. Logic circuitry within the sensor station activates the sensor transmitter, and sends an annunciator signal to the monitor station when the doorbell button is pressed. Also in the preferred embodiment, activation of the sensor station and transmission of an annunciator signal may be initiated by the presence of a human being in the location of a sensor, such as an infrared sensor, in the sensor station.

27 Claims, 14 Drawing Sheets

VIDEO DOORBELL SYSTEM

BACKGROUND OF THE INVENTION

A. Field of the Invention

This invention relates to apparatus for announcing the presence of a person at the entrance of a structure or certain other localities to an occupant of the structure, and for communicating between the occupant and visitor. More particularly, the invention relates to signalling, voice communication, and video camera apparatus connectable to an existing doorbell button.

B. Description of Background Art

Frequently, an occupant of a structure such as an apartment building or private residence would like to communicate with a visitor, family member, or other such person, who has rung a doorbell located at the entrance to the structure. Having identified the person, the occupant can decide whether he or she wishes to admit the person to the building and/or to communicate further with the person. Thus, some apartment buildings are equipped at their entrances with an annunciator system comprising an array of doorbell buttons, and a microphone and loudspeaker allowing two-way voice communication between a visitor and the occupant of an apartment selected by the visitor. Such systems often include an electromechanical door release mechanism operable remotely by the apartment occupant, to let authorized individuals into the apartment building. Some annunciator systems also include a closed circuit television system including a camera viewing the building entranceway, the camera being connected to a television monitor viewable by occupants of the building.

Annunciator systems permitting two-way voice communications and one-way remote viewing usually require the installation of relatively long runs of interconnecting cables which must be installed in unobtrusive locations such as spaces between walls. Such cable installations can add considerable expense and inconvenience to the installation of such annunciator systems. That expense and inconvenience may at least partially explain the relatively small number of individual homes or small businesses having annunciator systems provided with voice and/or video transmission capability.

To eliminate the requirement for extensive cable installation procedures, some devices disclosed in the prior art utilize a radio-frequency (RF) link to carry two-way voice signals between a building entranceway and a monitoring station within the building. However, these prior art systems must still be connected to a source of electrical power. Some prior art annunciator systems possess a video as well as audio signal transmission capability, but require the use of cables connected between an annunciator station and a monitor station.

Typical prior art monitoring or annunciator systems of the type described above are described in the following United States Patents:

Moore, U.S. Pat. No. 3,480,727, Nov. 25, 1969, Closed Circuit Television Protection System:

Discloses a closed circuit television system for use in monitoring a door or other entranceway, to permit recognition of a visitor before the door is opened. The system includes wiring between a camera and loudspeaker located near the door, to a television monitor in which the filament of the picture tube is constantly energized by heating current, thereby allowing instant display of a scene viewed by the camera, when a switch is actuated. The direction of one-way voice communication between the camera loudspeaker/microphone and the monitor loudspeaker/microphone is selectable by a switch.

Desanti, U.S. Pat. No. 4,075,659, Feb. 21, 1978, Electronic Door Announcer:

Discloses an electronic door announcer for apartments of a multi-family dwelling having a community television antenna in which signals due to sound and video operation of the announcer are carried by at least part of the community antenna coaxial cable system, switching means for the individual apartments being connected into said coaxial cable system.

Cohn, U.S. Pat. No. 4,370,675, Jan. 25, 1983, Doorbell Actuated Television Security System:

Discloses a video security system with intercom activated by means of a doorbell. The video input to a remote camera is automatically presented on the video display of a television receiver upon activation of the doorbell while audio from the intercom's speaker microphone is output through the television receiver's speaker system. Following a predetermined time interval after doorbell actuation, the system automatically turns off. If the television receiver is on when the doorbell is actuated, the system automatically provides video camera and intercom information at the television, reverting to the received television signal mode of operation upon user selection.

Levinson, et al., U.S. Pat. No. 4,523,193, Jun. 1, 1985, Remote-Controlled Doorbell Signal Receiver:

Discloses a remote-controlled doorbell adapted for connection across the existing doorbell in a building having a wired doorbell system. A transmitter for generating an over-the-air radio signal is coupled across the wired doorbell so that the transmitter will be actuated in response to current flowing through the wired doorbell. A remote receiver coupled to sound producing means receives the over-the-air radio signal and actuates the sound producing means when the existing doorbell is energized.

Lefkowitz, U.S. Pat. No. 4,524,384, Jun. 18, 1985, Video and Audio Security System:

Discloses a video and audio system for monitoring an area, particularly an area adjacent a door. The system includes a video and audio assembly adapted to be mounted to a door and a video and audio console spaced from the door. Opening of the door is controlled by an electric door strike operated from the console. Both the console and the assembly include audio elements which permit simultaneous two-way communication. A limited number of conductors, one of which carry high voltage, couple the assembly and the console.

Chern, et al., U.S. Pat. No. 4,764,953, Aug. 16, 1988, Method and Apparatus for Remote Doorbell Answering:

Discloses an apparatus for providing remote answering of a doorbell that includes a circuit for receiving a doorbell signal indicative that a doorbell switch has been actuated. An autodialing circuit is coupled to and responsive to the receiving circuit and a telephone line for dialing a telephone number responsive to the doorbell signal. An alerting circuit generates an alert signal to be transmitted over the telephone line to the telephone number dialed by the autodialing circuit, so that the alert signal may alert a party answering the remote telephone to the fact that the party is responding to a doorbell rather than a normal telephone call. An audio speaker is physically situated near the doorbell switch, for reproducing audio signals from the telephone line which are generated at the remote telephone. An audio microphone is also physically situated near the doorbell switch, for generating electrical signals responsive to sounds made near the doorbell switch and transmitting the signals to the telephone line to the remote telephone. The apparatus further includes a switching network for coupling the door speaker and microphone to a local telephone set and a remote telephone set selectively in any combination.

Tatsumi, et al., U.S. Pat. No. 4,843,461, Jun. 27, 1989, Over-Door Interphone System Provided With a Night-Vision Monitoring Device:

Discloses an over-door interphone system for telephone communication between a master station unit, inside of a house, and a remote station unit, outside of an entrance door of the house, that is provided with a night-vision monitoring device. The system includes a television camera having a solid state camera sensitive to infrared light, and an infrared illuminator source comprising an array of infrared light emitting diodes.

Morotomi, et al., U.S. Pat. No. 4,959,713, Sep. 25, 1990, Home Automation System:

Discloses a home automation system in which a coaxial cable or other data bus is placed inside a home to connect an intercom unit and monitor camera for communication with visitors, to a conventional home television connected to the bus, thereby making it possible to output audio and video signals from the intercom unit and monitor camera on a conventional broadcast reception television.

The present invention was conceived of to provide an improved annunciator/monitoring system which eliminates the requirement for running electrical power and signal cables to a remote annunciator or monitoring station.

OBJECTS OF THE INVENTION

An object of the present invention is to provide a system for communicating information from a remote location to a monitoring location, without requiring interconnecting wires between the respective locations.

Another object of the invention is to provide a wireless information-communicating system not requiring an external primary source of electrical power.

Another object of the invention is to provide a doorbell annunciator system not requiring interconnecting wires between a remote location and a monitoring location.

Another object of the invention is to provide a wireless doorbell annunciator system not requiring an external source of primary electrical power at a remote location.

Another object of the invention is to provide a wireless doorbell annunciator system incorporating means for drawing electrical power from doorbell button wires at a level sufficient to charge storage elements within the system for proper operation, but not so large a level as to cause operation of a bell or other previously existing annunciator device wired to the doorbell button.

Another object of the invention is to provide an internally powered annunciator system that is actuable by depressing a doorbell button to send a wireless annunciator signal to a monitoring device comprising a part of the system.

Another object of the device is to provide a doorbell-button powered annunciator system actuable by a sensor device to send a wireless annunciator signal to a monitoring device upon detection of a human being in the presence of the sensor device.

Another object of the invention is to provide a wireless doorbell system capable of conducting voice signals between a remote annunciator device and a monitoring device.

Another object of the invention is to provide a wireless doorbell system capable of conducting a video signal from a scene viewed by a remote device to a monitoring device.

Another object of the invention is to provide a video doorbell system incorporating means for automatically interrupting scenes displayed on a television monitor and displaying scenes viewed by a remote viewing device.

Another object of the invention is to provide a video doorbell system incorporating means for interrupting a telephone conversation and conveying to the telephone receiver audio signals received by a remote microphone.

Another object of the invention is to provide a video doorbell system including a hand-held portable device for communicating by voice with a remote location and for controlling operation of a video monitoring system.

Another object of the invention is to provide a video doorbell system including a telephone interface unit providing a capability for two-way voice communication between the telephone handset and a remote microphone and loudspeaker installation, and for controlling operation of the system.

Another object of the invention is to provide a system for monitoring audible and visible information in the vicinity of remote sensor apparatus.

Another object of the invention is to provide a system for monitoring audible and visible information in which a plurality of self-contained remote viewing and listening stations may transmit video signals and audio signals to a monitoring station, and receive audio signals from the monitoring station.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends an annunciator system including a remote sensing station which is capable of transmitting audio and visual data to a monitoring station via modulated radio waves. In one embodiment of the system, a sensing station including a microphone, loudspeaker, and television camera is mounted near the entrance to a building, and contains an internal battery which is trickle-charged by electrical power derived from doorbell button wires, the latter being in series with a source of electrical power and an annunciator such as a doorbell. The trickle charge rate is controlled to a sufficiently low value to prevent unwanted activation of the existing doorbell.

Circuitry included in the sensing station responds to actuation of the doorbell button, or triggering of an optional infrared sensor by the presence of a person near the sensor, to send via radio waves an annunciator signal to a monitoring station within the building. Both visual images of, and voice transmissions from, the visitor may be sent via the RF link. An RF transceiver within the sensing station also permits voice communications to be sent from a person at the monitoring station and outputted from a loudspeaker in the sensing station, permitting two-way voice conversations between the visitor and monitor viewer.

In the preferred embodiment, the system includes apparatus to automatically interrupt television viewing and/or telephone conversations within the building upon reception of the annunciator signal. Means may also be provided to permit operation of the video doorbell system by depressing appropriate buttons in the keypad of a standard "TOUCH-TONE" (DTMF) telephone.

Also, the system may optionally include a portable controller and voice communicator which may be used to conduct two-way voice communication between a visitor and a building occupant, and to remotely control operation of a television monitor by the occupant.

The annunciator system according to the present invention may also be configured to sequentially and remotely command transmissions of audio and/or visual data from selected stations of a plurality of remote sensing stations. The remote sensing stations may include self-contained, solar-powered units as well as doorbell stations powered by a doorbell power source.

DETAILED DESCRIPTION OF THE INVENTION

1. Overview

Referring now to FIGS. 1 through 16, a novel video doorbell system according to the present invention is shown.

Figure 1B:
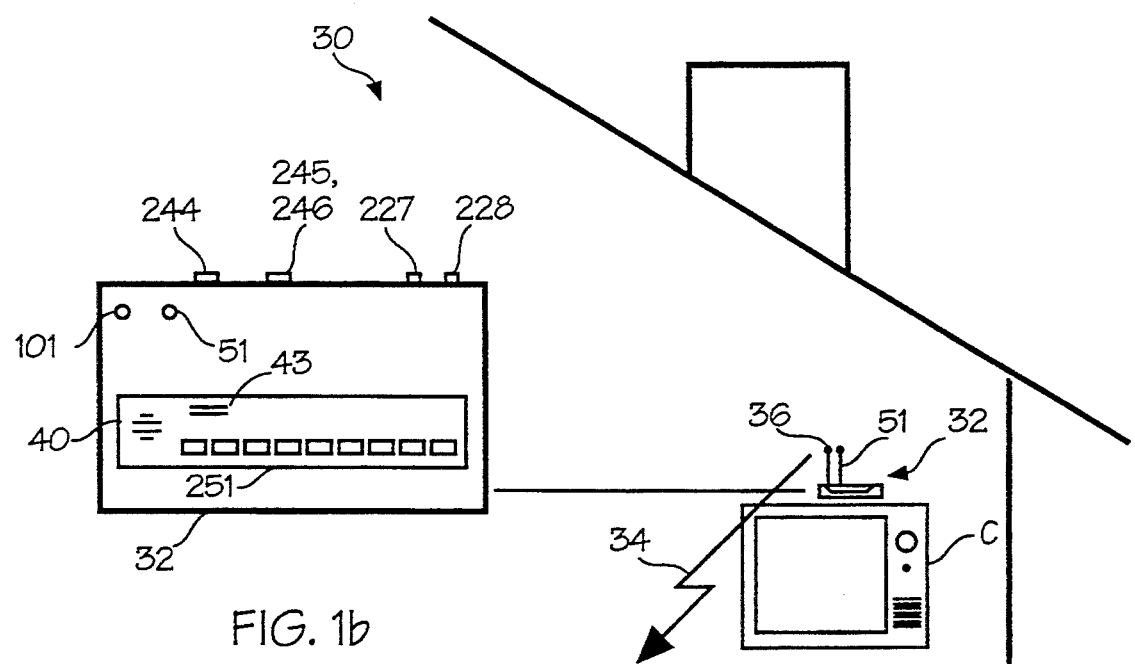
FIG. 1B is a pictorial diagram of a basic embodiment of a video doorbell system according to the present invention.
Figure 10:
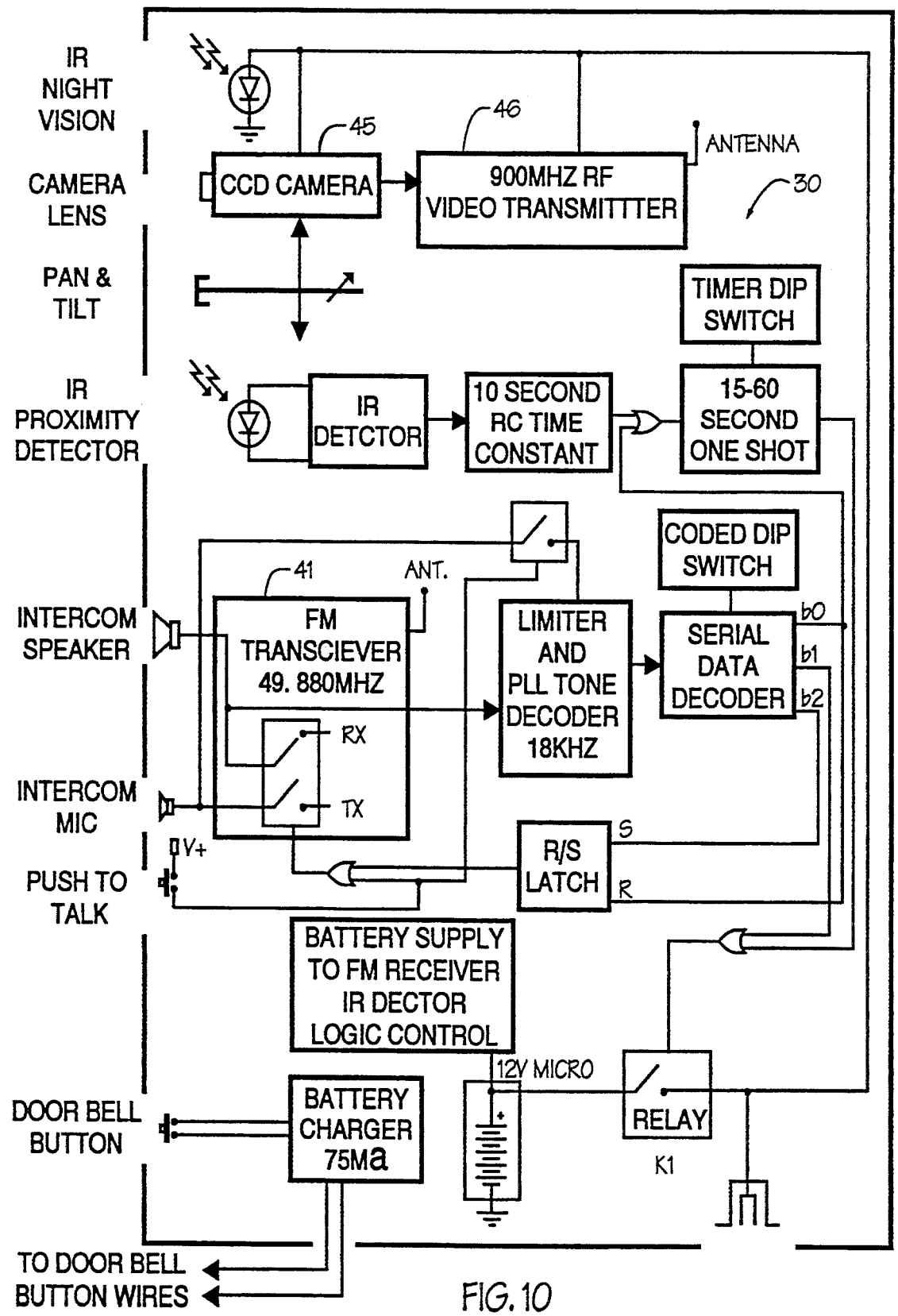
FIG. 10 is a block diagram of a basic embodiment of a Video Doorbell Station (DBS) comprising a first major component of a video doorbell system according to the present invention.
Figure 11:
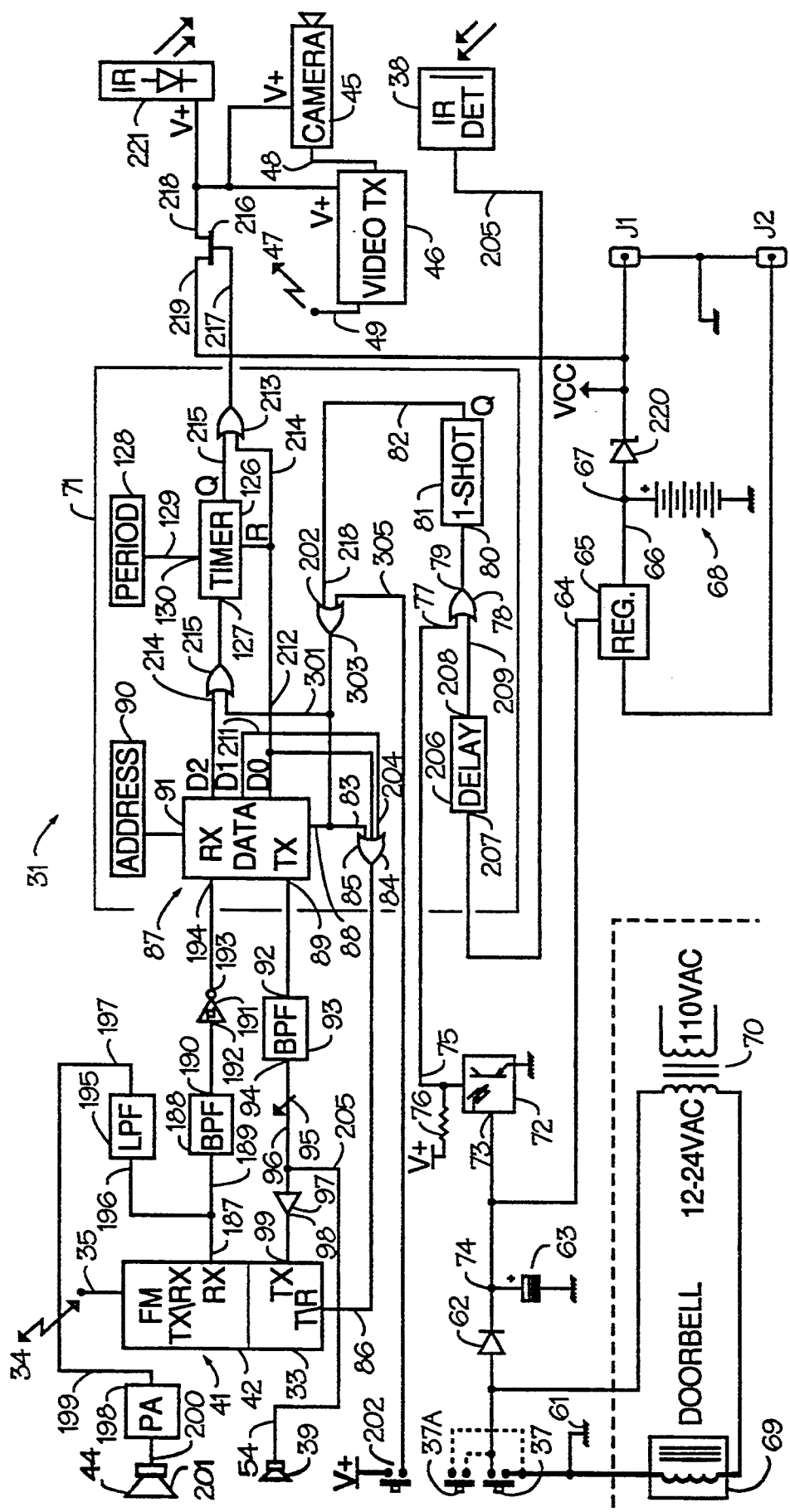
FIG. 11 is a block diagram similar to FIG. 10, but somewhat more detailed and partially schematic.

As shown diagrammatically in FIG. 1, a basic embodiment of the Video Doorbell System (VDBS) 30 includes a remote sensing station module 31 referred to as a Doorbell Station (DBS) that is adapted to be mounted to a building A near an entranceway B of the building. Video Doorbell System 30, according to the present invention also includes a Video Receiver Station (VRS) 32 that is located within building A, typically near a television monitor C. As shown in FIGS. 10 and 11, doorbell station 30 includes a first radio frequency (RF) transmitter 33, operating at a frequency of, for example, about 49 megahertz (Mhz). The function of transmitter 33 is to transmit an RF signal 34 to Video Receiver Station 32, FIGS. 12 and 13, between DBS antenna 35 and VRS antenna 36. RF signal 34 is generated by transmitter 33 in response to actuation of a doorbell button 37 on DBS 31, or to actuation of a sensor, preferably a pyroelectric infrared detector 38 responsive to the presence of a person in the vicinity of the DBS, as will be explained in detail below. Other types of sensors, such as those employing ultrasonic waves or microwaves, could of course be used in place of an infrared detector.

In the preferred embodiment of system 30, transmitted RF signal 34 may be modulated by audio signals detected by a microphone 39 in DBS 30, thus permitting voice communications to be transmitted from the DBS to a loudspeaker 40 in Video Receiver Station 32. Also in the preferred embodiment of system 30, first transmitter 33 of DBS 30 is part of a transceiver 41 which also includes an RF receiver 42 for receiving voice communications picked up by a microphone 43 located in Video Receiver Station 32. Receiver 42 is connected to a loudspeaker 44 in DBS 31, allowing voice communications to be transmitted from a person within the building to a visitor. Thus, the preferred embodiment of Video Doorbell System 30 affords a capability for two-way voice communications between a visitor in the vicinity of Doorbell Station 31 and a person at Video Receiver Station 32.

A particularly novel and advantageous feature of Doorbell Station 30 is its capability of being substituted for an existing doorbell button without requiring the installation of any power or signal wires. The structure and function of Doorbell Station 30 that affords this capability is described in detail below. As may be seen best by referring to FIGS. 1 and 11, Doorbell Station 31 includes a pushbutton 37 that replaces the function of the original doorbell button at entranceway B of building A. Optionally, pushbutton 37 can be connected by wires to an existing doorbell button, allowing operation of the system by either pushbutton, while allowing placement of doorbell station 31 out of easy reach of vandals.

The preferred embodiment of Doorbell Station 31 also includes a television camera 45. Preferably camera 45 is of the type employing a solid state, Charge Coupled Device (CCD) as an imaging transducer. Video output signals from CCD camera 45 are connected to a second radio frequency transmitter 46, where the video signals are used to modulate an RF signal 47 transmitted by the second transmitter. Preferably, second RF transmitter 46 operates at a different frequency from that of first transmitter 33. Thus, for example, second RF transmitter 46 may operate at a nominal frequency of 910 Mhz. The function of second transmitter 46 is to transmit an RF signal 47 modulated by a composite video signal 48 produced by CCD camera 45. Video RF signal 47 is transmitted from antenna 49 to an antenna 51 coupled to a video receiver 50 located in Video Receiver Station 32. A composite video signal representing a scene viewed by CCD camera 45 may then be coupled to a television monitor C in a manner described in detail below.

2. DETAILED DESCRIPTION OF THE PREFERRED EMBODIMENTS

FIGS. 1 and 2 and FIGS. 10 through 11 show a Video Doorbell Station (DBS) 31 comprising one of two major components of a Video Doorbell System (VDBS) 30 according to the present invention. As may be seen best by referring to FIGS. 1 and 2, Video Doorbell Station 31 includes an enclosure 60 of a suitable size and shape to be attached to a structure wall, for example, adjacent to a doorway B of a building A, as shown in FIG. 1. In a particular embodiment of housing 60 found suitable by the present inventors, enclosure 60 is a rectangular box of the approximate dimensions of 2 inches thick by 4-½ inches wide by 6-½ inches high.

Figure 1A:
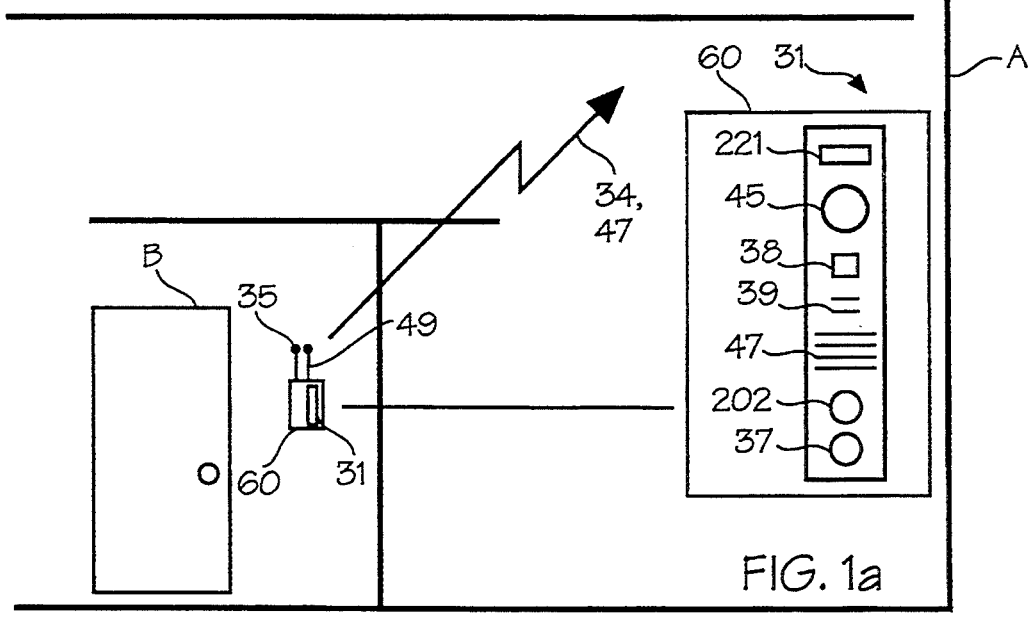
FIG. 1, including FIG. 1A
Figure 2:
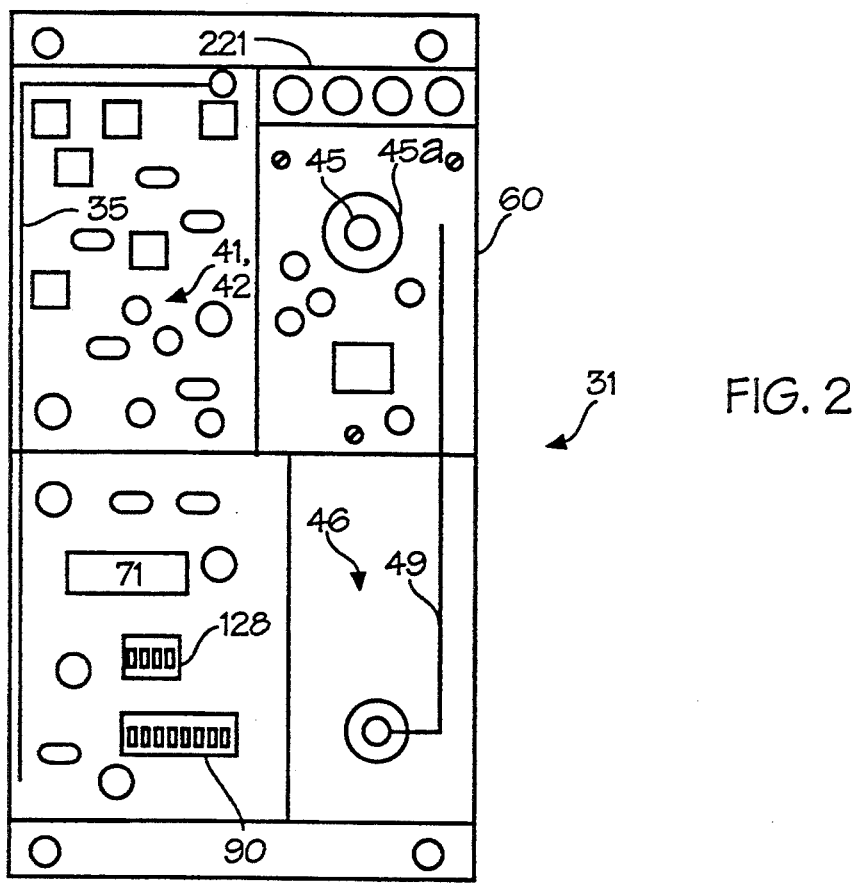
FIG. 2 is a partly sectional front elevation view of a Video Doorbell Station (DBS) of FIG. 1, showing a front cover of the DBS removed.
Figure 3:
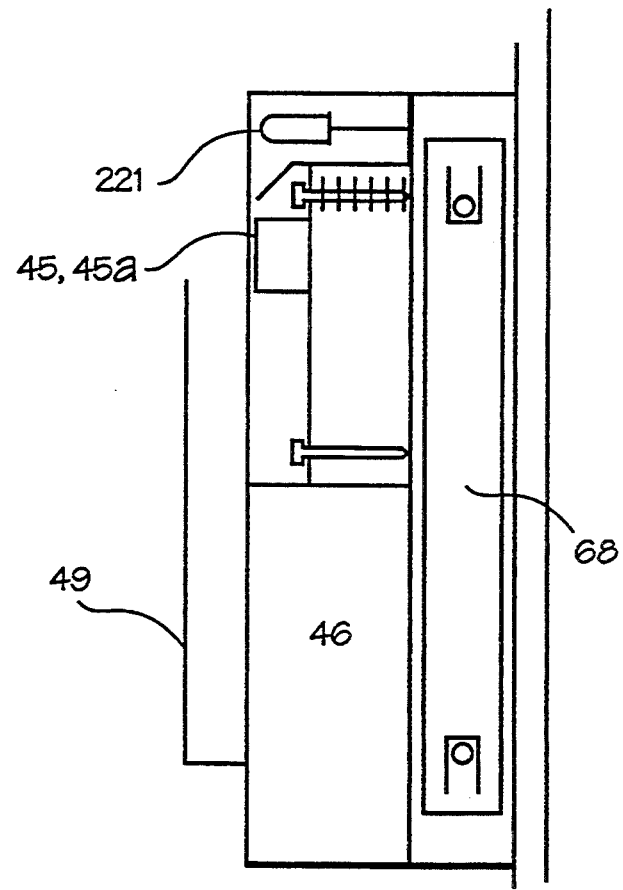
FIG. 3 is a sectional side elevation view of the apparatus of FIGS. 1 and 2.
Figure 4:
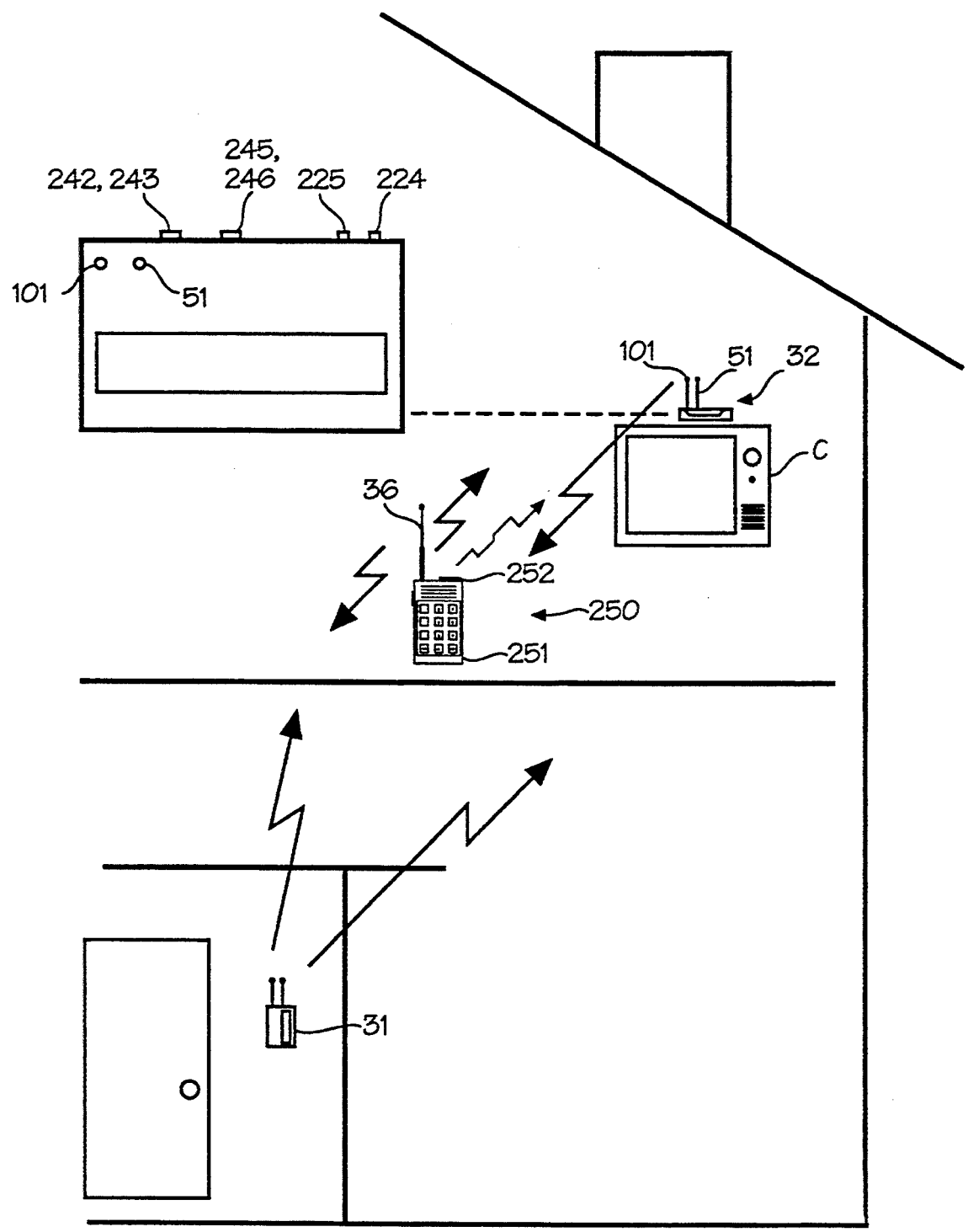
FIG. 4 is a pictorial diagram of an alternate embodiment of a video doorbell system according to the present invention, using a hand-held controller and voice communicator.
Figure 5:
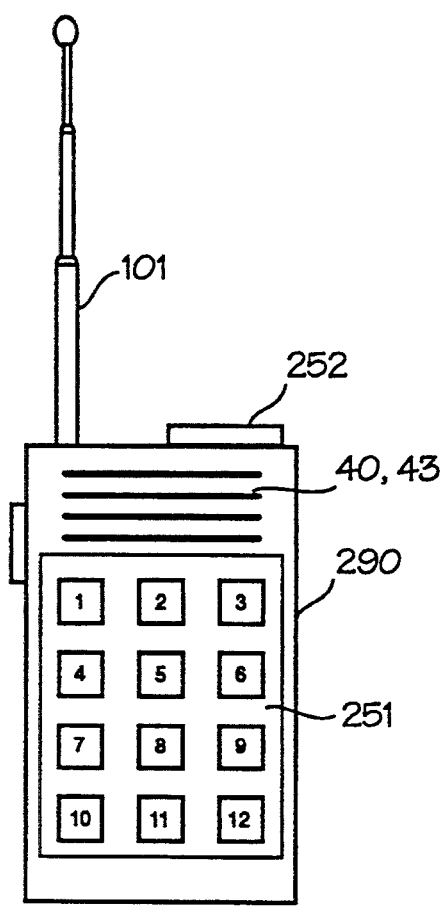
FIG. 5 is a more detailed view of the hand-held controller apparatus of FIG. 4.
Figure 6:
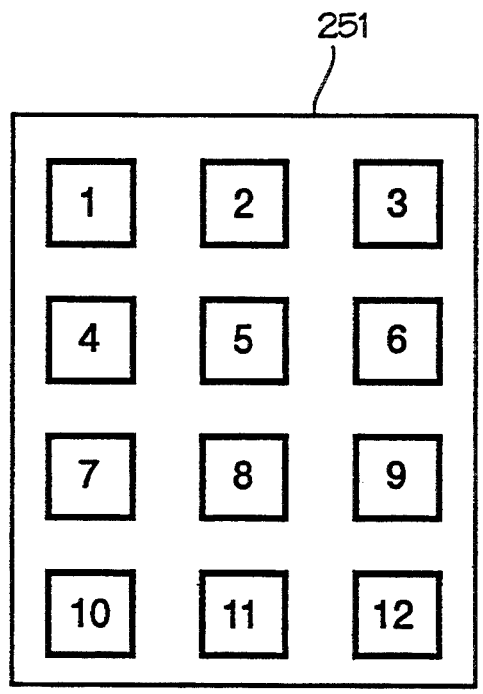
FIG. 6 is an enlarged, fragmentary upper plan view of the apparatus of FIG. 5.
Figure 7:
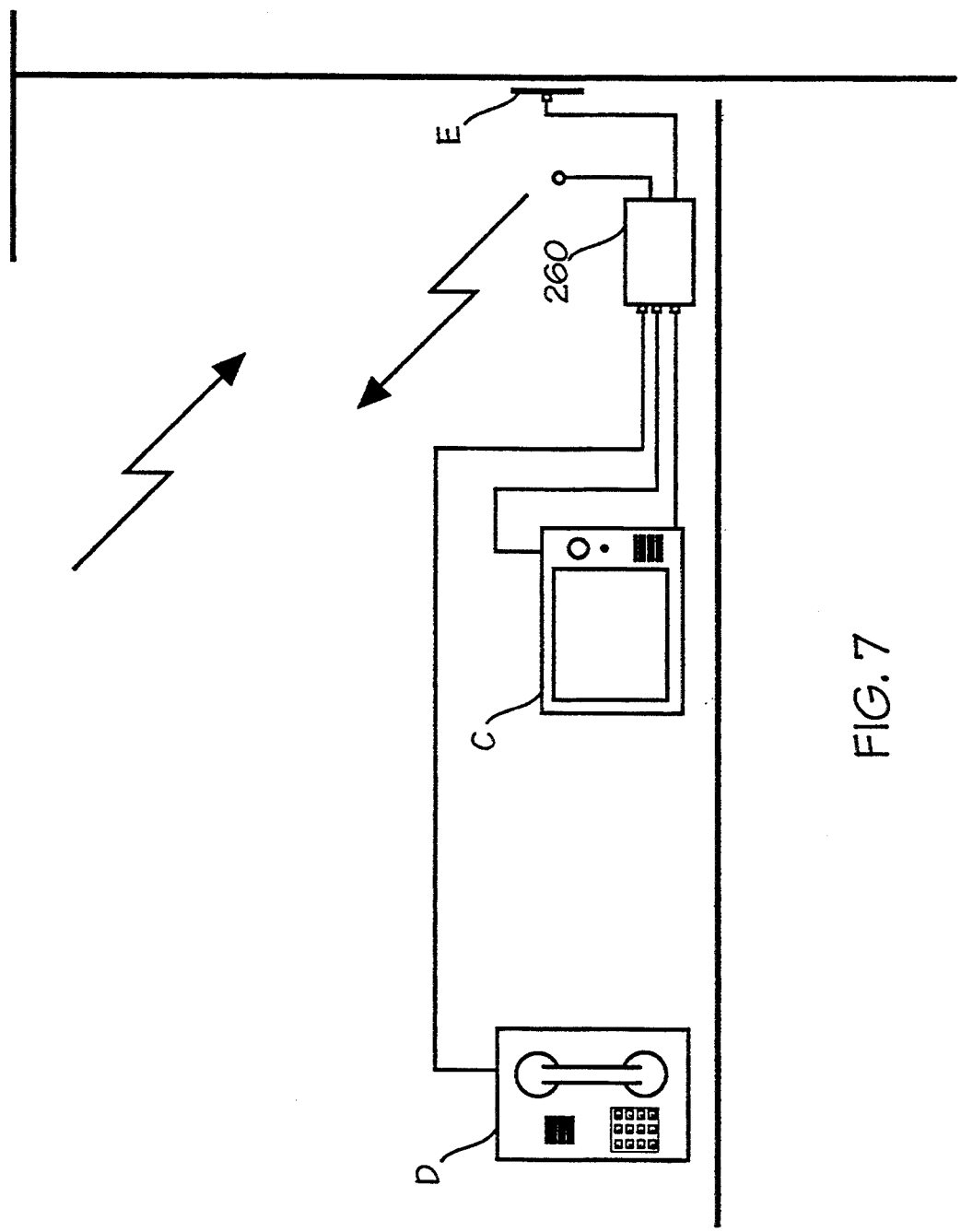
FIG. 7 is a schematic view of a telephone interface unit usable with the system of FIG. 1.
Figure 8:
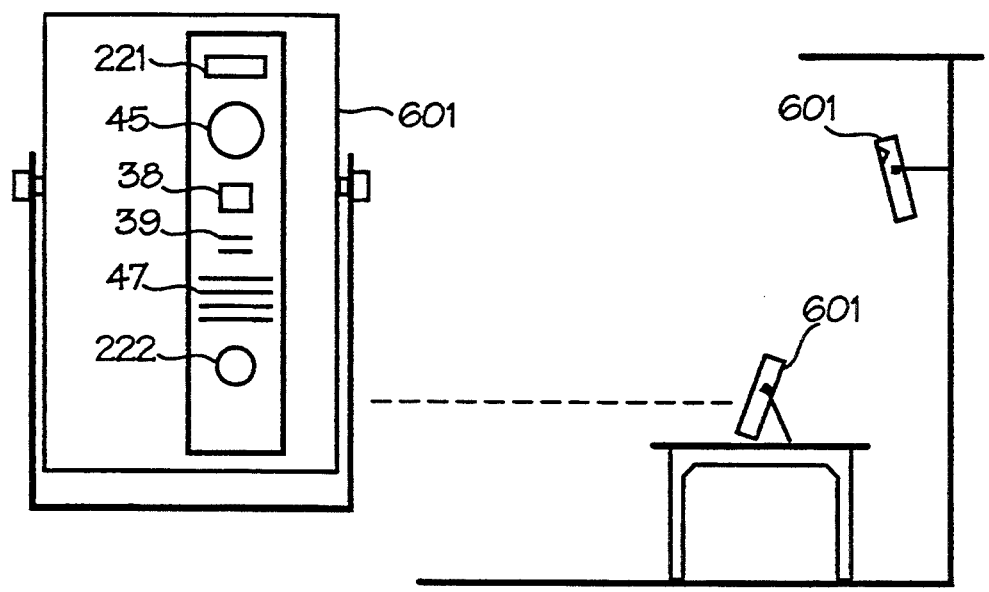
FIG. 8 is a perspective view of a portable Video Doorbell Station (DBS) usable with the system of FIG. 1.
Figure 9:
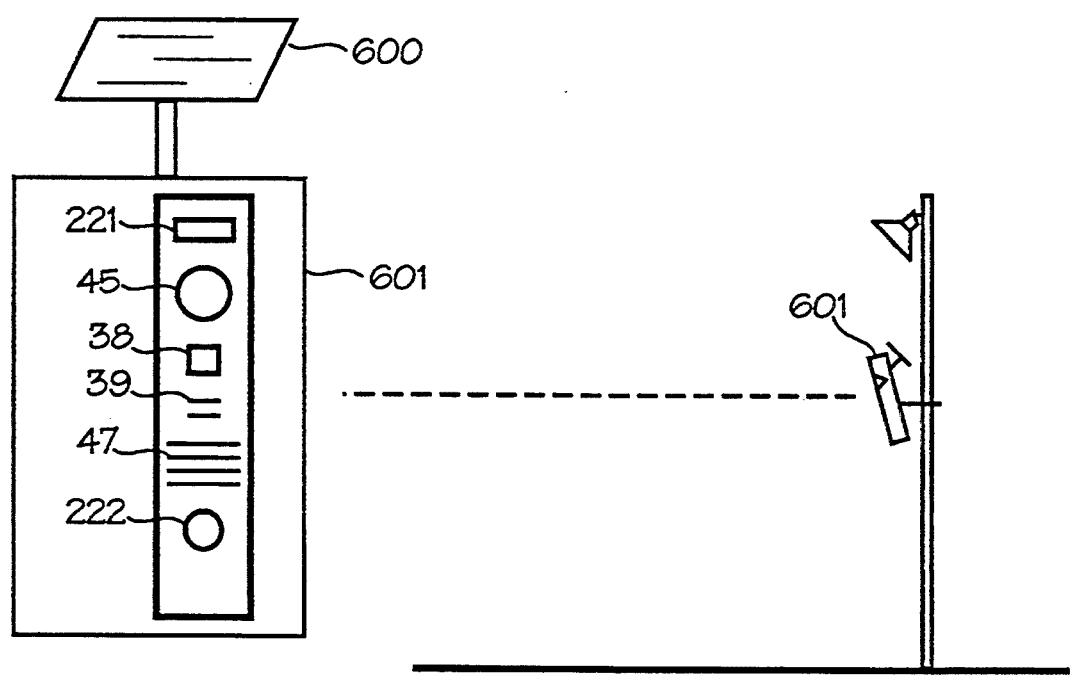
FIG. 9 is a perspective view of a modification of the DBS of FIG. 8, showing the modified DBS attached to a pole.

As may be seen best by referring to FIG. 1A, Video Doorbell Station 31 includes a pushbutton switch 37 that replaces the doorbell button originally installed at the entrance to building A. In certain applications where it would be desirable to mount housing 60 away from an existing doorbell button, to place Doorbell Station 31 out of reach for vandals, for example, a pair of wires may be led out of the enclosure to the existing doorbell. In this configuration, the existing doorbell button 32A and pushbutton 37 would be connected in parallel, as shown in FIG. 11.

As shown in FIGS. 10 and 11, one terminal of SPST pushbutton 37 is connected to a common ground terminal 61 for circuitry within enclosure 60, while the other terminal of the pushbutton is connected to the anode terminal of rectifier 62. Also as shown in FIGS. 10 and 11, rectifier 62 comprises a single diode. Optionally, rectifier 62 could be a full wave bridge rectifier comprising four diodes. In either case, the cathode(s) output terminal(s) of rectifier 62 are connected to the positive terminal of a filter capacitor 63 and to the positive input terminal 64 of a constant current regulator 65. An output terminal 66 of regulator 65 is connected to the positive terminal 67 of a 12-volt nickle-cadmium (NICAD) rechargeable battery 68. Regulator 65 is adjusted to trickle-charge battery 68 at a level insufficient to cause doorbell 69 to ring. Thus, alternating current normally supplied to doorbell 69 by transformer 70 through a doorbell button is rectified by rectifier 62 and used to maintain battery 68 at a sufficient charge level to operate all of the electrical circuitry of Video Doorbell Station 31. We have found that limiting the charging current drawn from rectifier 62 to a value of about 75 milliamperes provides a satisfactory charging rate for battery 68 while ensuring that doorbell 69 will not ring unless pushbutton 37 is depressed.

As was described previously in the overview, Video Doorbell Station (DBS) 31 includes a radio frequency transceiver 41 for sending via RF-signal 34 audio information picked up by microphone 39 of the DBS to Video Receiver Station (VRS) 32, and for receiving RF from the Video Receiver Station via RF-signal 34 voice communications spoken into microphone 43 of the Video Receiver Station and conducting these voice signals to loudspeaker 44 of the Video Doorbell Station. As was also described in the overview,. Video Doorbell Station 31 includes a CCD camera 45 which modulates an RF output signal 47 produced by Video Transmitter 46 and transmitted to Video Receiver Station 32. Video Doorbell Station 31 also includes timing and control circuitry designated generally by the box 71 in FIG. 11. As those skilled in the art will recognize from the ensuing description of the functions of box 71, those functions could be performed by a microprocessor, as well as by integrated and/or discrete electronic devices. Transceiver 41, transmitter 46, and timing and control circuitry 71 of Video Doorbell Station 32 are powered and actuated when pushbutton 37 is depressed, in a manner which will now be described.

As shown in FIG. 11, Video Doorbell Station 31 includes an opto-isolator 72, an input terminal 73 of which is connected to positive terminal 74 of filter capacitor 63. When pushbutton 37 is momentarily depressed, filter capacitor 63 is discharged at a sufficiently fast rate for opto-isolator 72 to turn off, allowing the output terminal 75 of the opto-isolator, which is connected internally to the collector of a photo-transistor within the opto-isolator, to rise to a logic true level, since the output terminal is connected through a pull-up resistor 76 to a positive collector supply voltage VCC. Thus, opto-isolator 72 is used here as a threshold detector, producing a logic true level at its output terminal 75 when the voltage input to rectifier 62 is reduced to zero upon depressing pushbutton 37 (or an existing doorbell button 37A, if connected to 37).

Output terminal 75 of opto-isolator 72 is connected to a first, or "A" input terminal 77 of a two-input OR gate 78. Output terminal 79 of OR gate 78 is connected to the trigger input terminal 80 of a monostable multivibrator or "one-shot" 81. Thus, when doorbell button 37 is depressed, the resulting transition of output terminal 79 of OR gate 78 to a logic true level causes a logic true voltage pulse, preferably of about one-second duration, to occur at the output terminal 82 of one-shot 81. The aforementioned one-shot pulse initiates a sequence of operations in doorbell station 31, which will now be described.

As shown in FIGS. 10 and 11, output terminal 82 of one-shot 81 is connected through an OR gate 302 to an input terminal 83 of a 4-input OR gate 84. Output terminal 85 of OR gate 84 is connected to transmit/receive mode select input terminal 86 of FM transceiver 41. When terminal 86 is true, FM transceiver 42 is placed in a transmit mode. Timing and control circuitry 71 also includes a serial encoder/decoder 87 having a transmit/receive (Tx/Rx) mode control input terminal 88 connected to output terminal 82 of one-shot 81 through OR gate 30Y. When mode control input terminal 88 receives a true-going pulse from one-shot 81, serial encoder/decoder 87 is placed in a transmit mode for the duration of the pulse, outputting serial data bits on serial output port 89. In this mode, the address of a particular doorbell station 31, which has been previously selected by the user by means of contact closures of a DIP switch 90 inside enclosure 60 which is connected to a parallel data input port 91 of serial encoder/decoder 87, is outputted on serial output data port 89. Serial output data port 89 is connected to input port 92 of a 10-KHZ bandpass filter 93. The function of bandpass filter 93 is to eliminate unwanted harmonics from the rectangular pulse train emitted from output port 89 of serial encoder/decoder 87.

Figure 12:
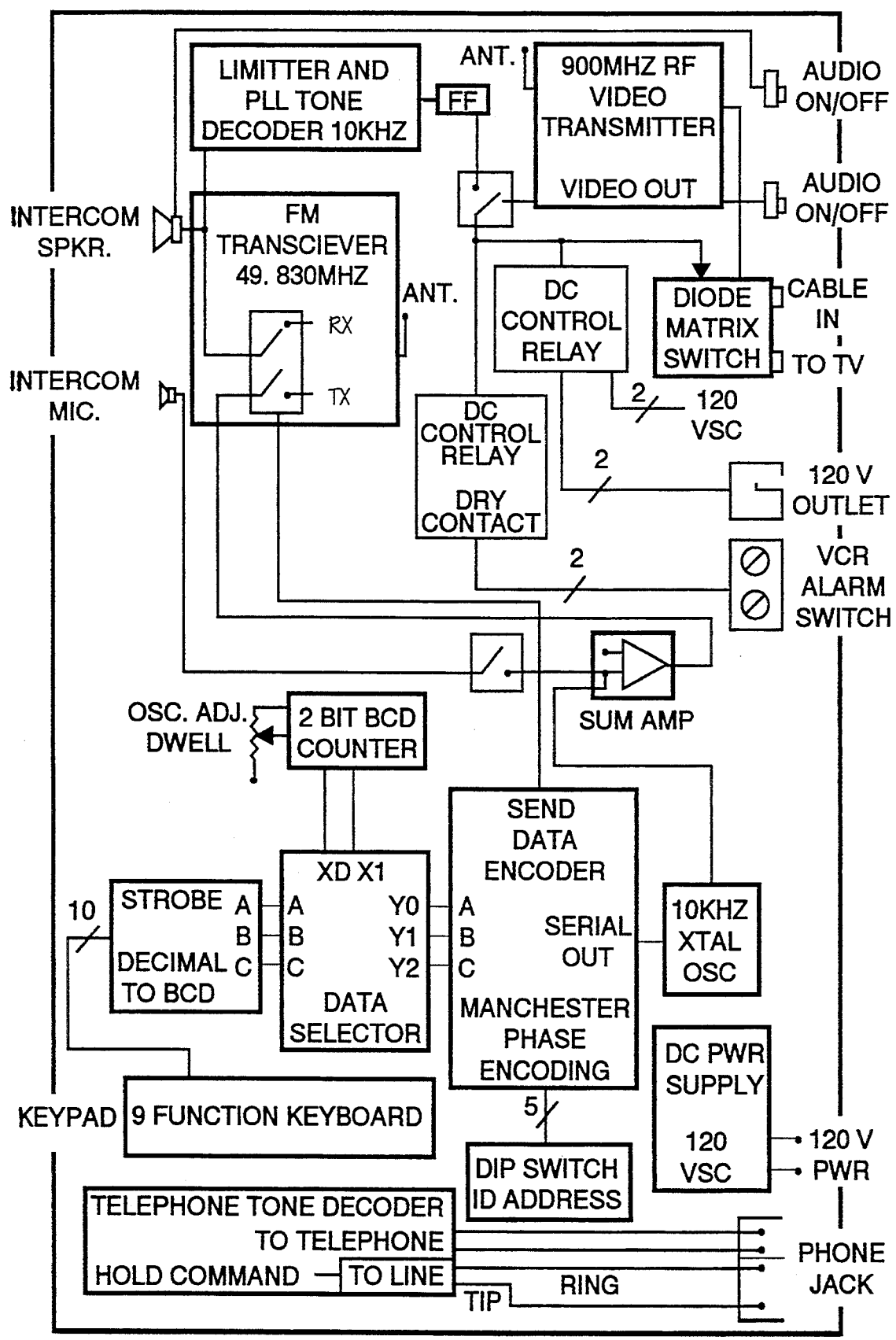
FIG. 12 is a block diagram of a basic embodiment of a video doorbell receiving station (VRS) comprising a second major component of a video doorbell system according to the present invention.
Figure 13:
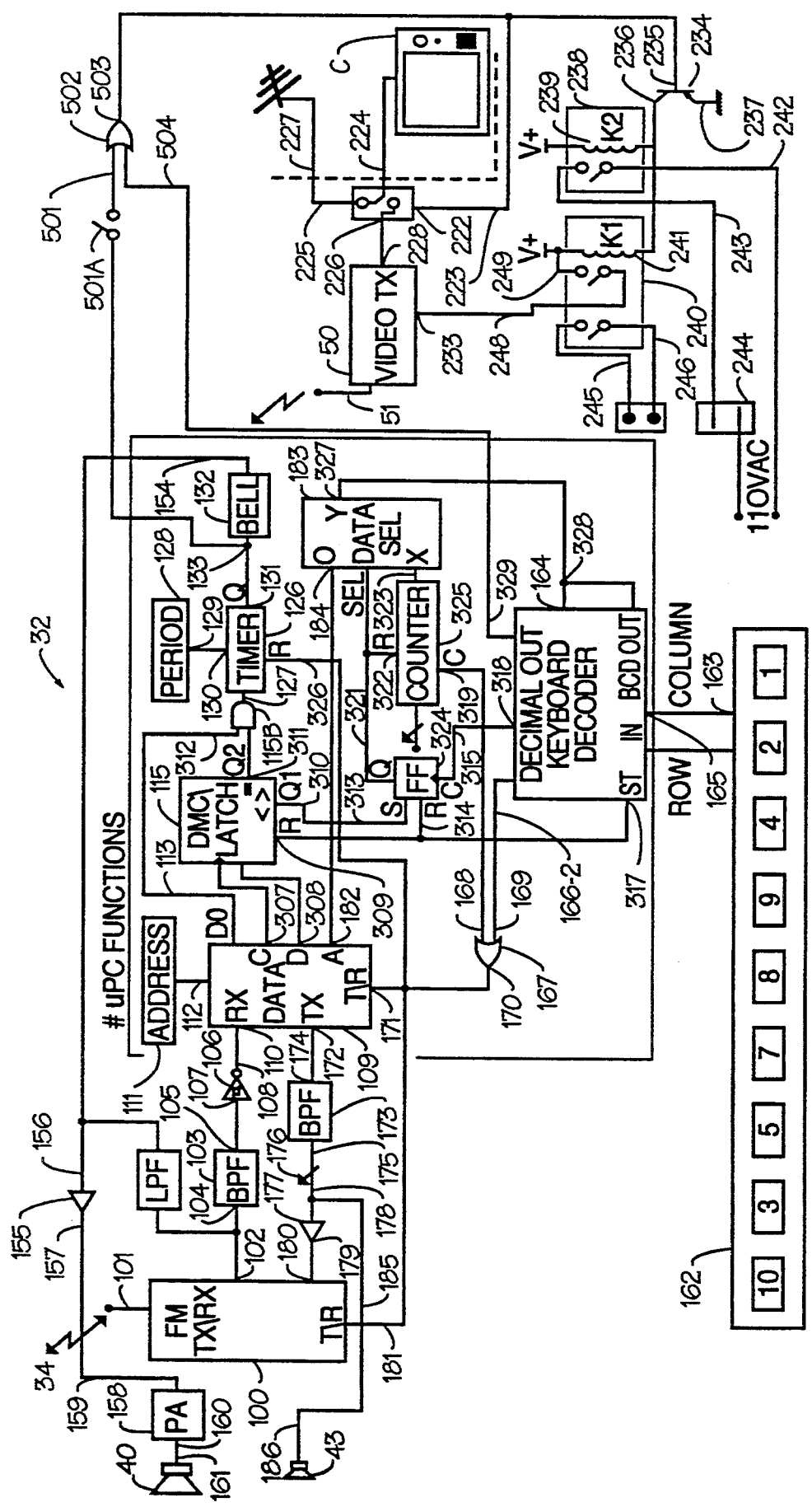
FIG. 13 is a block diagram similar to FIG. 12, but somewhat more detailed and partially schematic.

Output terminal 94 of bandpass filter 93 is connected through a modulation level control potentiometer 95 to an input terminal 96 of a summing amplifier 97. The output terminal 98 of summing amplifier 97 is connected to the modulator input terminal 99 of FM transceiver 42. This arrangement results in production of an FM RF signal 34 outputted from FM transceiver 41 which is phase-modulated with Manchester encoded data identifying the address of doorbell station 31. Referring now to FIGS. 12 and 13, as well as FIGS. 10 and 11, a one-second long burst of RF energy modulated by the DBS address data is transmitted by DBS FM transceiver 42 to an FM transceiver 100 in video receiver station 32, being received by an antenna 101 connected to that transceiver. Transceiver 100 includes a demodulator having an output terminal 102 on which demodulated signals, typically in the audio frequency band, appear. Transceiver demodulator output terminal 102 is connected to input terminal 104 of 10-KHZ bandpass filter 103. An output terminal 105 of bandpass filter 103 is connected to input terminal 107 of a low level comparator 106. Output terminal 108 of comparator 106, on which a digital bit stream representing the address of a doorbell station 31 which is transmitting to Video Receiver Station 32 appears, is connected to serial input port 110 of a serial decoder/encoder 109.

Serial decoder/encoder 109 is programmed by user-selected contact closures of a DIP switch 111 connected to a parallel input port 112 of serial decoder/encoder 109 to a particular address. If the address of a Video Doorbell Station 31 encoded on the signal inputted to serial input terminal 110 of serial decoder/encoder 109 coincides with the pre-set address of the decoder/encoder, a true signal is outputted from DO output terminal 113 of the decoder/encoder for the duration of the transmitted signal. Simultaneously, logic network 115 receives the synchronized serial data clocked from output terminals 307 and 308 of data decoder 109. The logic network 115 contains two shift registers, one static, one dynamic and a digital magnitude comparitor (DMC). The incoming serial data is then stored in the dynamic registers and compared to data in the static register through the DMC where it is decided if the two words match, making "Q2" output 311 true, or are unequal, making "Q1" output terminal 310 true. The reset terminal 309 clears the two registers via the keyboard strobe line 317. True logic levels on D0 and Q2 output terminals 113 of serial decoder/encoder 109, and Q2 output 311 of DMC latch 115 are inputted to logic network 115, including latch 115A and AND gate 115B, which produces at its output terminal a true logic level upon the receipt by Video Receiver Station 32 of a burst of RF energy from a Video Doorbell Station 31 having an address corresponding to an address programmed into serial decoder/encoder 109 by DIP switch 111. Output terminal 125 of logic network 115 is connected to a trigger input terminal 127 of a programmable timer 126. A "ring duration" or PERIOD DIP switch 122 has an output port 129 connected to an input port 130 of programmable timer 126. Programmable timer 126 is programmable by DIP switch 128 to produce at output terminal 131 of the programmable timer a true logic level having duration adjustable from 15 seconds to 60 seconds in 15-second increments. The storing and comparing of the stored data to real time data is performed by an Automatic Dwell State Detector, which will now be described.

An Automatic Dwell State Detector detects when more than one slave station is active during the preset period of timer 126. Once the dynamic shift register has latched its first successful address, it will continue to be compared to the static register "real time data" being received within the time period. If a second slave station becomes active within this time period and the user does not acknowledge the first address annunciation, then the DMC will output an unequal "no-match" detection on "Q1" output terminal 310, indicating that more than one station is transmitting its information.

FLIP-FLOP 324 directs the dwell state command. In normal operation, keyboard decoder 164 outputs the "sequence command" 318 to the clock input terminal 315 of the flip-flop (strobe 317 remains low). During this time, "Q" output terminal 321 toggles either high or low. When "Q" terminal 321 is high, counter 325 is disabled via reset terminal 322 and the "select line" of data selector 183 connects BCD data 328 of keyboard decoder 164 to the "Y" input 327 of data selector 183, which in turn appears at "0" output terminal 184. Output terminal 184 is connected to address input terminal 182 of data encoder 109. Data on this line represents the control bits for the various remote camera/VDB locations. These control bits are added to the present address of address dip switch 111, and transmitted for remote reception. Likewise, when "Q1" output terminal 310 of the DMC/latch 305 is true, reset terminal 313 of flip-flop 324 forces "Q" output terminal 321 of the flip-flop low. This in turn enables counter 325 via reset terminal 322 to output a 2-bit "counting code" to input terminal 323 of data selector 183. Data select line 183A of data selector 183 connects the 2-bit counting code from the 0" output terminal 184 of the data selector, to address input 182 of data encoder 109. The 2-bit counting code is synchronously transmitted via clock output 319 of counter 325 and OR gate input 168. The dwell state is canceled when keyboard strobe line 317 is inputted to SET terminal 314 of flip-flop 324.

As shown in FIG. 13, KEYBOARD DECODER 164 decodes keyboard information from keyboard 162. When used in telephone interface unit, FIG. 16, the keyboard decoder also decodes BCD information from DTMF decoder 261. Keyboard decoder 164 can interpret the incoming data at terminal 165 as either BCD or decimal outputs. It also contains a keyboard strobe line, item 317 which monitors keyboard activity, producing a true output for the duration of a key closure. Keyboard 162 is configured in an X, Y matrix that contains 10 to 12 push buttons. Push button functions of keyboard 162 are:

1—Listen
2—Talk
3—Call up (turn on and transmit door station video)
4—Channel 3 Select T.V.
5—Camera sequence
6—Camera 1 (home)
7—Camera 2 (home)
8—Camera 3 (home)
9—Camera 4 (home)
10—Power on/off Output terminal 131 of programmable timer 126 is connected to an enable input terminal 133 of "acoustic bell simulator" circuitry 132. When enable input terminal 133 is true, acoustic bell simulator circuitry 132 produces on its output terminal 154 an analog signal having a frequency spectrum approximating that of a ringing bell. That output signal is coupled to an input terminal 156 of a summing amplifier 155. Output terminal 157 of summing amplifier 155 is connected to an input terminal 159 of an audio power amplifier 158. Output terminal 160 of audio power amplifier 158 is connected to input terminal 161 of loudspeaker 40 of Video Receiver Station 32. Thus, when Video Receiver Station 32 receives a properly encoded annunciator signal from a Video Doorbell Station 31, loudspeaker 40 of the Video Receiver Station 32 outputs an acoustic bell-like signal alerting a building occupant in the vicinity of the Video Receiver Station that a visitor has pressed the doorbell button of a Video Doorbell Station.

Video Receiver Station 32 includes means for switching both FM transceiver 100 and serial decoder/encoder 109 into a transmit mode Thus, for example, if a building occupant hears a ringing signal emitted by loudspeaker 40, the occupant may depress a TALK button 162-2 on a control keyboard 162 included in the Video Receiver Station 32. Keyboard 162 has an output port 163 connected to the input port 165 of a keyboard decoder 164.

When TALK button 162-2 is depressed, output terminal 166-2 of an output port 166 of keyboard decoder rises to a logic true level. Since output terminal 166-2 of keyboard decoder 164 is connected to B input terminal 169 of an OR gate 167, pressing talk button 162-2 causes a logic true level to occur at the output terminal 170 of the OR gate. Output terminal 170 of OR gate 167 is connected to Tx/Rx mode select input terminal 171 of serial decoder/encoder 109.

When mode select input terminal 171 of serial decoder/encoder 109 is at a logic true level, the serial decoder/encoder 109 is placed in a transmit, or encoding mode. In this mode, the address of Video Receiver Station 32, inputted to serial decoder/encoder 109 via address DIP switch 111, is emitted as a serial data word on serial output port 172 of the serial decoder/encoder. Serial output port 172 is connected to input port 174 of a 10-KHZ bandpass filter 173. Output terminal 175 of bandpass filter 173 is connected through a modulator level control potentiometer 176 to an input terminal 178 of a summing amplifier 177. The output terminal 179 of summing amplifier 177 is connected to the modulator input terminal 180 of FM transceiver 100.

Now, since Tx/Rx mode select input terminal 181 of FM transceiver 100 is also connected to output terminal 170 of OR gate 167, the FM transceiver is placed in a transmit mode simultaneously with serial encoder/decoder 109. Thus configured, Video Receiver Station 32 transmits an RF signal back to Video Doorbell Station 31 which is phase-modulated with a code effective in selecting a desired video doorbell station of a group of Video Doorbell Stations. The complete address emitted by FM transceiver 100 contains bits entered into a parallel data input port 182 of serial encoder/decoder 109, that data input port being connected to a data output port 184 of a data selector 183.

Summing amplifier 177 that drives modulator input terminal 180 of FM transceiver 100 also has a second input terminal 185 that is connected to the output terminal 186 of microphone 43 of Video Receiver Station 32. Thus, when FM transceiver 100 is in a transmit mode, FM modulated RF signal 34 emitted by the transmitter includes voice communication signals spoken into microphone 43.

At Video Doorbell Station 31 (FIGS. 10 and 11), FM-modulated RF signal 34 is received by antenna 35 and coupled to FM transceiver 41. Contained within FM transceiver 41 is a demodulator having an output terminal 187 on which are emitted the audio signals and digital data which were inputted to summing amplifier 177 of Video Receiver Station 32.

Demodulator output terminal 187 of FM transceiver 41 is connected to input terminal 189 of a 10-KHZ bandpass filter 188. Output terminal 190 of 10-KHZ bandpass filter 188 is connected to input terminal 192 of a low level comparator 191. Output terminal 193 of low level comparator 191 is connected to serial input port 194 of serial encoder/decoder 87. Serial digital data on input port 194 is used to direct operation of timing and control circuitry 71 of Video Doorbell Station 31, as was previously described.

Demodulator output terminal 187 of FM transceiver 41 is also connected to the input terminal 196 of a 3-KHZ low-pass filter 195. The function of 3-KHZ low-pass filter 195 is to filter out unwanted noise not contributing to the intelligibility of speech, and to filter out 10-KHZ digital data. Output terminal 197 of 3-KHZ low-pass filter 195 is connected to input terminal 199 of an audio power amplifier 198. Output terminal 200 of audio power amplifier 198 is connected to input terminal 201 of loudspeaker 44 of video doorbell station 31. Thus, voice communications spoken into microphone 43 of Video Receiver Station 32 and transmitted to a selected Video Doorbell Station 31 by modulated FM RF signal 34 are amplified and emitted by loudspeaker 44 in the selected Video Doorbell Station.

Voice communication between a visitor at a Video Doorbell Station 31 and a person in the vicinity of Video Receiver Station 32 may be initiated by the visitor's depressing a push-to-talk button switch 202 on enclosure 60 of the doorbell station. One contact of switch 202 is connected to a positive voltage source, while the other contact is connected through OR gate 202 to A input terminal 83 of OR gate 84. Thus, depressing switch 202 makes input terminal 83 and output terminal 85 of OR gate 34 go to a logic true state, as well as the Tx/Rx mode select input terminal 86 of FM transceiver 41, which terminal is connected to the output terminal of the OR gate. This places FM transceiver 42 in a transmit mode. Now, since output terminal 54 of microphone 39 on Video Doorbell Station enclosure 60 is connected to a second input terminal 205 of summing amplifier 97, electrical signals outputted from microphone 39 responsive to a visitor's speech will produce an amplified signal at output terminal 98 of the summing amplifier and modulation input terminal 99 of FM transceiver 41, modulating RF output signal 34 of the transceiver with voice signals.

As was described above, activation of a Video Doorbell Station 31 from a standby mode to an operating mode may be initiated by depressing doorbell button 37. Video Doorbell Station 31 desirably incorporates alternate means of being switched from a standby mode to an operating mode. Thus, as shown in FIG. 13, Video Doorbell Station 31 includes a "human presence sensor" (preferably an infrared proximity detector) 38 having a field of view encompassing a desired region, near the entrance of a building, for example. Output terminal 205 of IR detector 38 goes to a logic true level when a person comes within the field of view of the IR detector and sufficiently close to it. Output terminal 205 of IR detector 38 is connected to input terminal 207 of a delay circuit 206 having an RC time constant of about 10 seconds.

When input terminal 207 of time delay circuit 206 remains true for a period of ten seconds or greater, output terminal 208 of the time delay circuit goes true. Since output terminal 208 is connected to B input terminal 209 of OR gate 78, a true logic level at output terminal 208 initiates transmission of RF annunciator signal 34 from transceiver 41, that signal being receivable by Video Receiver Station 32 to indicate a visitor of that Video Doorbell Station 31, the address of which station is coded in the signal, in the manner previously described above for initiation of annunciator signal in response to actuation of doorbell button 37. The purpose of the delay introduced by time delay circuit 206 is to reduce the rate of false triggering of IR detector 38 by normal pedestrian traffic in the vicinity of the detector.

FM transceiver 41 of Video Doorbell Station 31 is also switched into a transmit mode upon receipt of a LISTEN command signal from video receiver station 32, which makes D1 output terminal 211 of serial encoder/decoder 87 true. Similarly, receipt by Video Doorbell Station 31 of a properly encoded DWELL command makes D2 output terminal 212 of serial encoder/decoder 87 true. A true output level on output terminal 212, which is connected to an input terminal 214 of an OR gate 213, causes output terminal 215 of the OR gate go to a logic true level. Output terminal 215 of OR gate 213 is connected to input terminal 127 of programmable timer 126. The output terminal 131 or programmable timer 126 is connected through OR gate 213 to the gate terminal 217 of a power field effect transistor (FET) 216 that is used to switch on power to CCD camera 45, video transmitter 46, and IR illuminator 221, all connected to source terminal 218 of the FET. Drain terminal 219 of FET 216 is connected to the anode terminal of a Shockley diode 220, the cathode of that diode being connected to positive terminal 67 of battery 68. The purpose of Shockley diode 220 is to block the D.C. voltage supplied by an external A.C. adapter connected to terminals J1 and J2 from being loaded down by battery 68.

Images of objects viewed by CCD camera 45 are displayed on television monitor C as follows.

Referring to FIGS. 10 and 11, a video transmitter 46 emits a radio frequency signal 47 in a frequency band between 900 and 914 MHZ which is amplitude-modulated with a composite video signal produced by CCD camera 45 in a Video Doorbell Station 31. As was described above, activation of CCD camera 45 and video transmitter 46 is accompanied by emission of an FM RF signal 34 modulated with an annunciator signal containing the identity code of the particular Video Doorbell Station 31 containing the camera. Referring to FIG. 13, "OR" gate 502 receives a command from either keyboard 162 though decimal output 329 of keyboard decoder 164, or the "Q" output 131 of timer 126 via the auto mode switch 501A. The output of "OR" gate 503 energizes relays K1 and K2 via transistor 234. In the "auto mode," when switch 501A is closed, "Q" output 131 of timer 126 is connected to input terminal 501 of "OR" gate 502. When timer 126 begins its interval, "Q" 131 goes true, causing terminal 503 of "OR" gate 502 to become true, energizing relays K1, K2 and diode matrix 222 as earlier described. Input terminal 504 of OR gate 502 is directly controlled by pushbutton 10 (on/off) of keyboard 162, also causing terminal 503 to go true.

First input port 25 of diode matrix 222 is connected to an existing TV antenna or cable 227. Second input 228 of diode matrix 222 is connected to demodulator signal output terminal 228 of AM video receiver 50.

In the absence of receipt of an annunciator signal from a Video Doorbell Station 31, matrix control input terminal 223 resides at a logic zero level, connecting TV monitor C with cable 227 and allowing normal viewing operations. Upon receipt of an annunciator signal from a Video Doorbell Station 31, matrix control input terminal 223 goes to a logic true level, connecting television monitor port 224 of diode matrix 222 with input port 226. This configuration of diode matrix 222 causes a scene viewed by CCD camera 45 to be substituted for an existing program on monitor C.

Output terminal 503 of "OR" gate 502 is also connected to base 235 of a relay-driver transistor 234. Collector 236 of relay-driver transistor 234 is connected to coil 239 of a first relay (K2) 238, and to coil 241 of a second relay 240. First relay 238 has a pair of contacts 242 and 243 which may be connected in series with a source of alternating current and a receptacle 244. Second relay (K1) 240 has a pair of contacts 245, 246 and 248, 249 not permanently connected to a power source. Contacts 248, 249 supply power to video receiver 50 when relay 240 is energized. The purpose of removing power from video receiver 50 is to prevent possible feed-through of extraneous video signals received by the video receiver, which signals might interfere with normal program reception. Live relay contact set 242 and 243, and dry relay contact set 245 and 246 may be used to turn on a time lapse recorder 247, or a monitor and light source, when Video Receiver Station 32 receives an annunciator signal.

Figure 14:
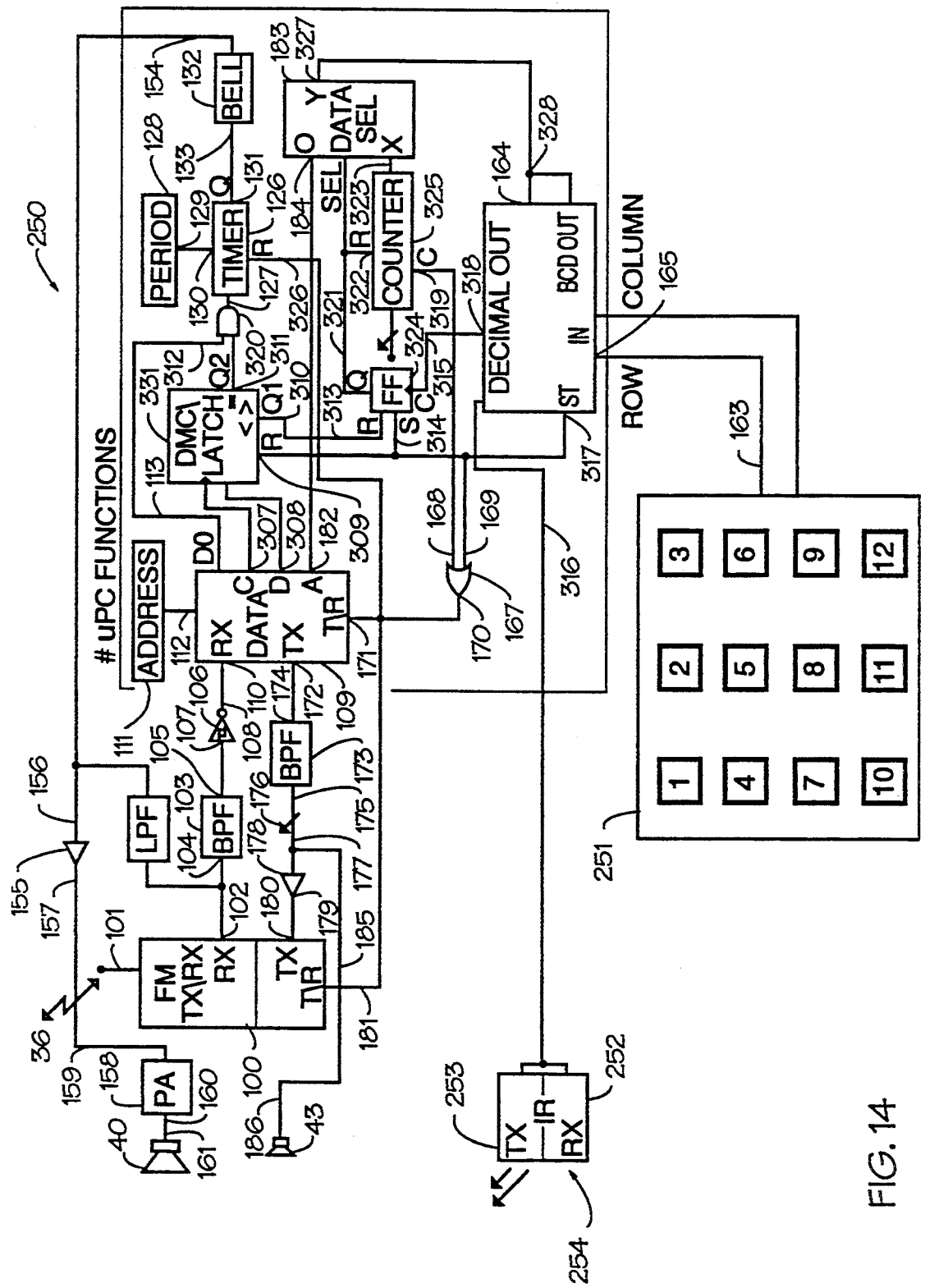
FIG. 14 is a schematic diagram of a wireless controller and voice communicator used in the alternate embodiment of the present invention depicted in FIG. 4.
Figure 15:
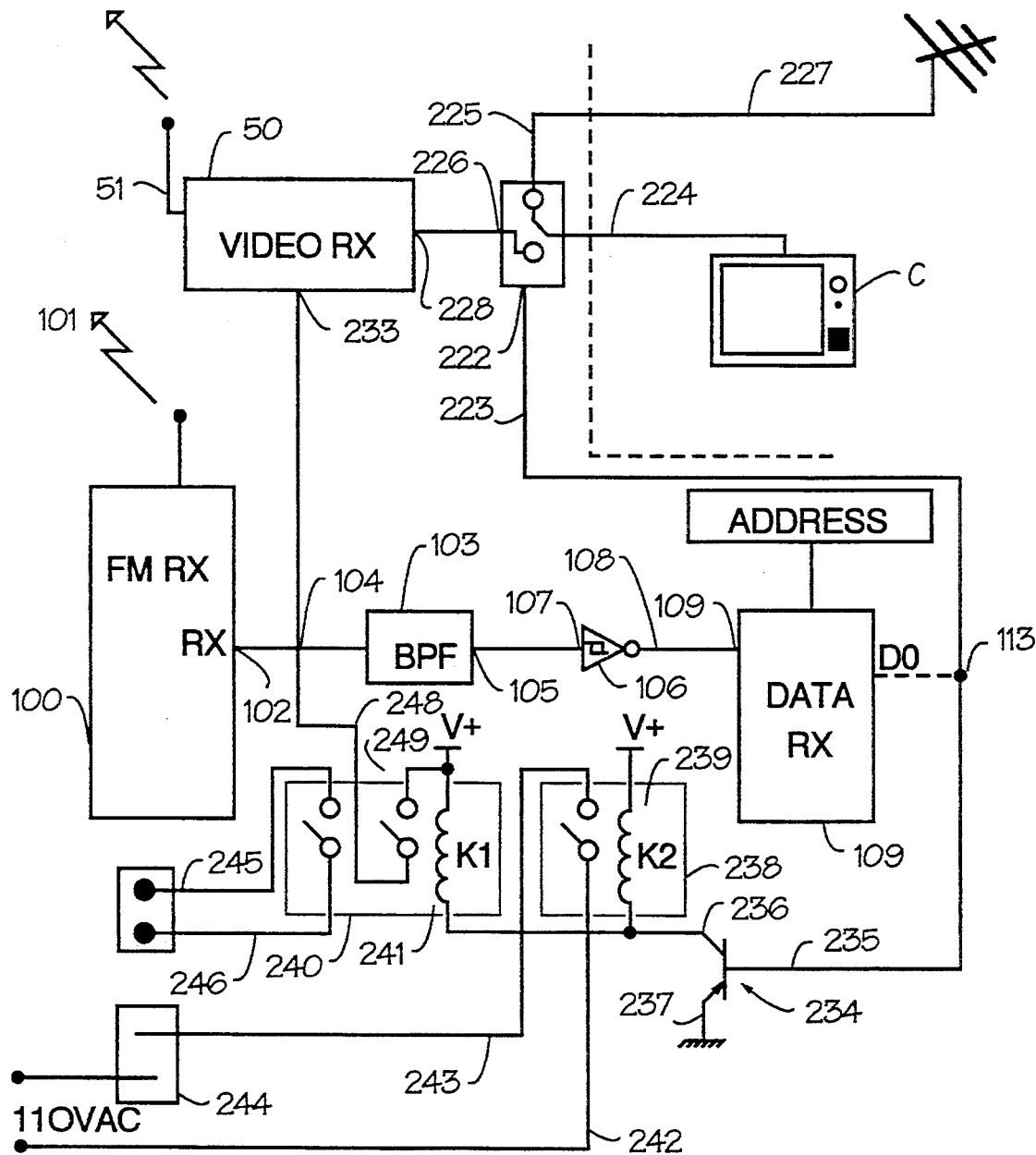
FIG. 15 is a schematic diagram of a relay station used with the wireless controller and voice communication of FIG. 14, in the alternate embodiment of the present invention depicted in FIG. 4.

FIG. 14 is a schematic diagram of a wireless controller and voice communicator useable in place of Video Receiver Station 32 shown in FIGS. 12 and 13. Wireless controller and voice communicator 250 comprises a self-contained, battery powered, hand-held apparatus that performs most of the functions of the Video Receiver Station depicted in FIGS. 12 and 13 and described above. FIG. 15 shows a relay station which is used in conjunction with the apparatus 250 of FIG. 14. Referring now to FIG. 14, hand-held apparatus 250 includes transceiver 100, a loudspeaker 40, and a microphone 43. Instead of a keyboard 162 of the type shown in FIG. 13, hand-held apparatus 250 uses a modified keyboard 251, as will be described in detail below. When using hand-held communicator 250, a video receiver 50 (FIG. 15) may be connected to a video modulator that produces an RF output signal on an unused channel (Channel 3 or Channel 4), the output of which is connected to antenna input multiplier of a television monitor. Thus, if the monitor is commanded to receive Channel 3, for example, a normal broadcast or cable program will be interrupted and replaced by the video signal received from a Video Doorbell Station 31 by video receiver 50.

Preferably, hand-held communicator 250 utilizes an existing infrared wireless control system of a television monitor which the communicator is used with, to permit remote switching of images displayed on the monitor between existing programs and Video Doorbell Station images. Thus, as shown in FIG. 14, controller/communicator 250 includes an infrared transceiver 252 having an infrared emitting diode (LED) 253 and an infrared-sensitive photodetector 254. LED 253 is used to send control commands to an existing infrared receiver on a television monitor. Photodetector 254 is used to "learn" the proper emitted infrared pulse sequence to command selection of Channel 3 or Channel 4, as will now be described.

The "LEARN" function of infrared transceiver 252 requires the user to press the learn function key for a duration of approximately 10 seconds. This time duration prevents normal button-pressing from accidently erasing the learned code. Code transference from an existing TV remote controller to hand-held communicator 250 is accomplished by butting the active areas of the two units together, allowing approximately 1 to 6 inches between the two units (this allows for different IR emitter alignments of different models). Simultaneously, the user will presses both the Channel 3 or 4 button on the TV remote controller and the learn function key of communicator 250 for the 10-second duration.

Infrared transceiver 252 contains an IR detector, amplifier/limiter, bandpass filter and comparator. The bandpass filter bandwidth is sufficiently broad to accept the variety of pulse patterns emitted by existing IR remote controllers. After the data is recovered as a square wave pulse train, it is inputted to a EEPROM (Electrically Erasable Read Only Memory) that records the pulse sequence. Once recorded, the pulse train may be recalled from the EEPROM by depressing a channel select button on the keyboard of communicator 250, and fed to a LED current driver that in turn may be used to remotely illuminate the infrared receiver of a television monitor. The push button functions of keyboard 251 are:

1—Listen
2—Talk
3—Call-up (turn on and transmit door station video)
4—Channel 3 Select T.V.
5—Camera sequence
6—Camera 1 (home)
7—Camera 2 (home)
8—Camera 3 (home)
9—Camera 4 (home)
10—Power On/off
11—Learn
12—VCR pause Referring now to FIG. 15, receipt of the FM signal causes DO output terminal 113 of serial encoder/decoder 109 of hand-held controller-communicator 250 to go true. Output terminal 113 of serial encoder/decoder 109 is connected to the control input terminal 223 of a diode matrix 222. Diode matrix 222 functions as a SPDT switch, connecting a common output port 224 with a first input port 225, with control input terminal 223 at zero volts, and connecting common output port 224 with a second input port 226, when the control input terminal is at a logic true voltage level. Aside from the fact that the drive signal for diode matrix 222 and relay driver transistor is derived from DO output 113, the operation is exactly as described above for VRS 32, FIG. 12.

Figure 16:
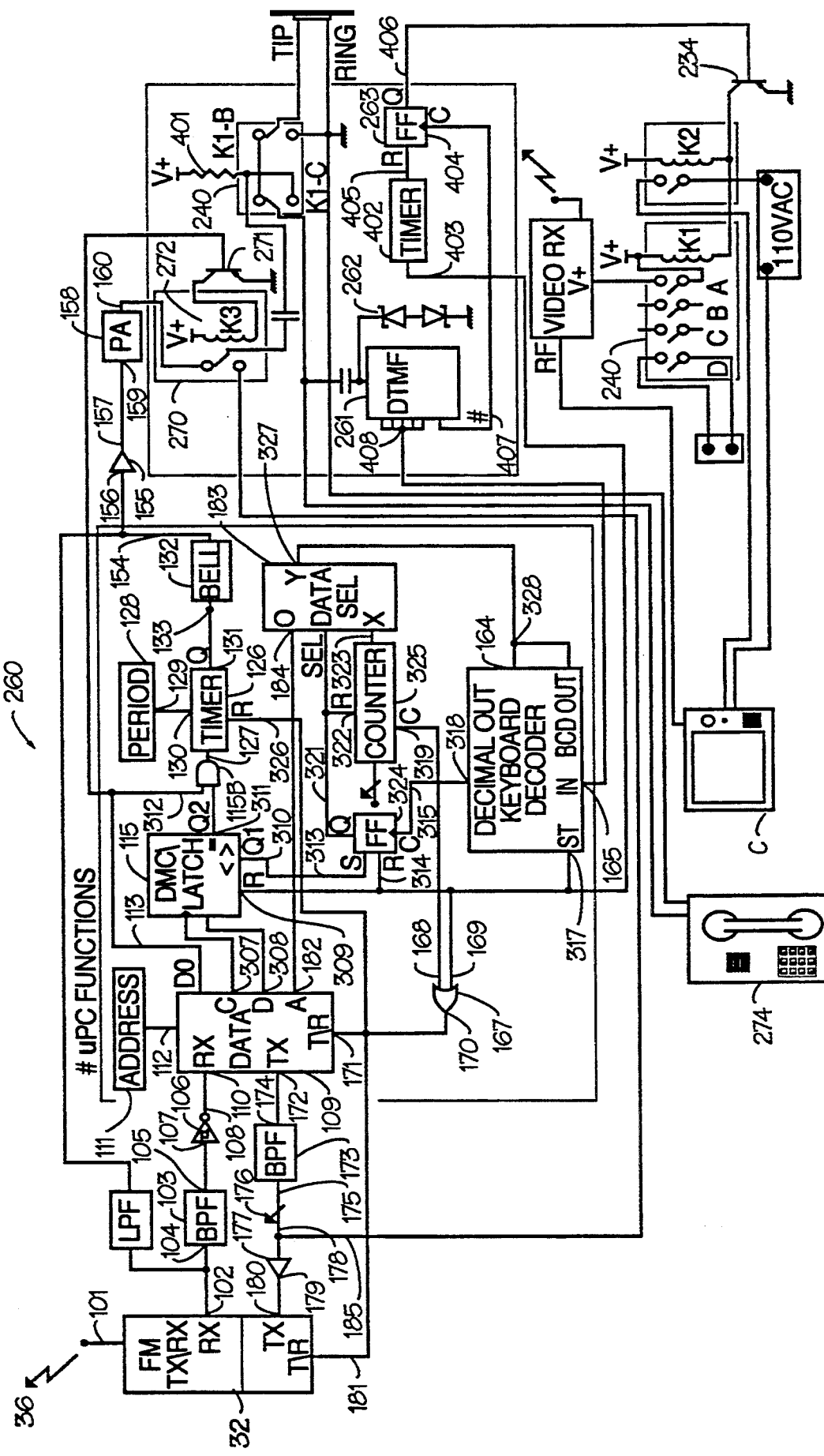
FIG. 16 is a block diagram of a telephone interface unit comprising a component of an alternate embodiment of the present invention, showing the interface unit interconnected with other components of the system.

FIG. 16 illustrates a telephone interface unit 260 that may be operably interconnected with a video receiver station 32. Major components and functions of telephone interface unit 260 are:

TELEPHONE INTERFACE

DTMF Tone Decoder 261 decodes dual-tone, multi-frequency (DTMF) encoded signal frequencies of a standard TOUCH-TONE telephone 274, and outputs a corresponding 4-bit binary word 408 to input port 165 of keyboard decoder 164. Numbers 1 through 4 are used to call up a selected camera from up to four separate VDBS camera locations. The asterisk (*) sign controls the sequence of the four cameras, while the pound (#) sign allows communication with a particular remote video doorbell station.

Input clamping diodes 262 limit the telephone lines 48-volt DC pulses and 90-volt AC 10-Hz ring pulses to a 5-volt logic signal level required at the input of the tone decoder.

The "Q" output 406 of flip-flop 263 toggles whenever the pound sign (#) is decoded, appearing on output terminal 407 if the DTMF decoder. This signal clocks input 404 of flip-flop 263, which in turn energizes relays K1 and K2 "on" or "off." Flip-flop 263 is reset when the "Q" output 405 of the 60-second "watchdog" timer 402 interval has expired. This in turn forces the "Q" output 406 of flip-flop 263 low, de-energizing K1 and K2 until the pound sign (#) is decoded again. The watchdog timer insures that if the user terminates a telephone conversation verbally, and then accesses the telephone intercom to a remote video station, that after 60 seconds, telephone operations will return to normal. Watch-dog timer 402 begins its interval when triggered input 403 is strobed by strobe line 317 of keyboard decoder 164.

Relay contacts A, B, C, D of K1 relay 240 supply power to the video receiver, direct the telephone's tip and ring, telephone functions to DTMF decoder 261 and audio transceiving, as well as effecting dry contact closures for external switching as described in FIG. 15, contacts 245, 246.

Relay contacts K1-B and K1-C control the phone line status. In their normal state, as shown in FIG. 16, normal phone operations occur and a direct path exists between the phone line feed and telephone, when K1 is energized by transistor 234, FIG. 15. However, K1-B shorts the "ring" and "tip" of the phone line feed, placing a phone caller on "hold," maintaining an "on hook" path. Simultaneously, K1-C connects the "tip" of the telephone to a 12 volt DC source, restoring operation and isolating the telephone from the phone line feed. In addition, load resistor 401 is placed in series with the 12 volt source, dropping the voltage to 10 volts for operation of DTMF telephone encoder, item D, and other normal telephone functions.

When a video doorbell station address is transmitted along with audio voice information by pressing push-to-talk switch 202, the K3 output of serial encoder/decoder 3 109 goes true. This signal in turn switches on drive transistor 271 energizing coil 272 of relay K3 270, closing contact set 273 and transmitting voice communications received by transceiver 100 to the earphone of telephone 274.

What is claimed is:

1. An apparatus for acquiring information from a remote location and transmitting said information to a monitoring location, without requiring interconnecting wires between said remote location and said monitoring location, said apparatus comprising;
    a. a sensor station, said sensor station including means for sensing physical quantities including audio and/or video information within the vicinity of said sensor station, signal transmission means responsive to said sensor means for wireless transmission of said audio and/or said video information to a monitoring location, internal energy storage means for powering said sensor station and coupling means adapting said internal energy storage means to be connected to and be recharged from an electrical power source for powering an annunciator such as a doorbell, said coupling means containing current limiting means whereby said energy storage means may be maintained in a charged state without causing an annunciator connected to said annunciator power source from being actuated, and
    b. a monitor station, said monitor station including means adapted to receive said information transmitted from said sensor station, means for producing an annunciator signal upon receipt of said information, and transducer means for producing perceptible signals functionally related to said sensed physical quantities, said transducer including means for displaying said transmitted video information on a television monitor.

2. The apparatus of claim 1 wherein said sensor station includes means responsive to actuation of a doorbell button connected to said doorbell power source in actuating said audio and/or video sensors, and activating said wireless transmission means.

3. The apparatus of claim 1 further including radiation sensing means responsive to the presence of a human being in activating said audio and/or video sensors, and activating said wireless transmission means.

4. The apparatus of claim 3 wherein said radiation sensing means is further defined as being an optical sensor.

5. The apparatus of claim 3 wherein said radiation sensing means is further defined as being an infrared sensor.

6. The apparatus of claim 3 wherein said radiation sensing means is further defined as being an ultrasonic sensor.

7. The apparatus of claim 3 wherein said radiation sensing means is further defined as being a microwave sensor.

8. An apparatus for acquiring audible and/or visible information from a remote location, transmitting said information to a monitor station, and receiving information from said monitor station, said apparatus comprising;
    a. a sensor station including
        (i) sensor microphone,
        (ii) a sensor transmitter connected to said microphone, said transmitter adapted to send a wireless signal modulated with audio information received by said sensor microphone,
        (iii) detection means adapted to ascertain the presence of a person in the vicinity of said sensor station, said detection means being operably interconnected to said sensor transmitter so as to modulate said wireless signal emitted by said sensor transmitter with a signal signifying said presence of a person,
        (iv) a sensor receiver connected to a loudspeaker, said receiver adapted to receive wireless signals modulated with intelligible sounds and emitting reproductions of said sounds from said receiver,
    b. a monitor station, said monitor station including
        (i) a wireless monitor receiver adapted to receive said modulated wireless signal emitted by said sensor transmitter,
        (ii) a monitor loudspeaker connected to said monitor receiver for reproducing sounds received by said microphone in said sensor station,
        (iii) a microphone,
        (iv) a monitor transmitter connected to said microphone, said monitor transmitter being adapted to send wireless signals modulated with audio information received by said monitor microphone, and
        (v) control logic responsive to said presence-indicating modulating signal in producing an annunciator signal perceptible in the region of said monitor station.

9. The apparatus of claim 8 further including means within said monitor station for selectively coupling audio information received from said sensor station to the earphone of a telephone, in place of audio information from another source.

10. The apparatus of claim 9 further including means within said monitor station for modulating said wireless signal emitted by said monitor transmitter with audio signals received by the microphone of a telephone.

11. The apparatus of claim 8 further including within said sensor station a television camera connected to said wireless transmitter adapted to send a wireless signal modulated with video information received by said television camera.

12. The apparatus of claim 11 further including within said monitor station means for recovering said video information and displaying said information on a monitor.

13. The apparatus of claim 12 further including means for coupling said video information selectably to an existing television monitor, in place of video information from another source.

14. The apparatus of claim 13 wherein said monitor station is further defined as being partitioned into
    a. a relay station containing a video receiver selectably coupleable to a television monitor, and
    b. a hand-held communicator, said communicator containing said audio transceiver components of said monitor.

15. The apparatus of claim 14 wherein said hand-held communicator is further defined as containing infrared transmitter means, whereby the operation of an existing television monitor may be controlled by infrared signals emitted by said infrared transmitter.

16. The apparatus of claim 15 wherein said hand-held communicator is further defined as including an infrared receiver, associated control logic and memory means, whereby said communicator is adapted to learn the control codes of infrared controllers for existing television monitors, and emulate those codes in a transmitted infrared signal to effect control of said monitors by said communicator.

17. The apparatus of claim 8 wherein said monitor station is further defined as including demodulation means operably connected to said receiver means, said demodulation means being operably connected to annunciator means for indicating to a person in the vicinity of said monitor station the presence of a person in the vicinity of said sensor station.

18. The apparatus of claim 17 wherein said detection means in said sensor station is further defined as being operably interconnected to a doorbell button, whereby depressing said doorbell button causes transmission of said modulated annunciator signal.

19. The apparatus of claim 18 wherein said sensor station contains an internal electrical energy storage means.

20. The apparatus of claim 19 wherein said internal energy storage means is operably interconnected to said doorbell button, whereby an electrical current is drawn from a doorbell power supply, of a magnitude sufficiently large to keep said energy storage means sufficiently charged to permit operation of said apparatus, but sufficiently small to prevent actuation of a doorbell connected to said doorbell power source and said doorbell button, unless said button in actuated.

21. The apparatus of claim 20 wherein said sensor station is further defined as including a wireless receiver.

22. The apparatus of claim 21 wherein said sensor station is further defined as having a loudspeaker operably interconnected to said receiver, whereby voice signals modulating a wireless signal received by said receiver are converted to intelligible sounds and emitted by said loudspeaker.

23. The apparatus of claim 22 wherein said monitor station is further defined as including a wireless transmitter having an output signal effective in being received by said receiver in said sensor station.

24. The apparatus of claim 23 wherein said monitor station is further defined as including a microphone operably connected to said wireless transmitter in said monitor station, whereby sounds received by said microphone in said monitor station modulate the output signal of said wireless transmitter, are received by said receiver in said sensor station, and reproduced at the output of said loudspeaker in said sensor station.

25. The apparatus of claim 24 wherein said monitor station is further defined as including reception control logic whereby reception of a wireless signal from a sensor station causes said monitor station to respond only if said wireless signal is modulated with a coded address corresponding to one of a group of addresses programmed into said monitor station.

26. The apparatus of claim 24 wherein said monitor station is further defined as including transmission control logic whereby said signal transmitted by said monitor station may be modulated by a sensor station address code selected by said monitor station.

27. The apparatus of claim 26 wherein said sensor station is further defined as including command control logic whereby said sensor station is switched from a quiescent state to an information-transmitting state upon reception of a modulated signal from said monitor station containing an address corresponding to an address pre-programmed into said sensor station.

* * * * *